United States Patent
Dohm et al.

(10) Patent No.: US 10,860,974 B2
(45) Date of Patent: *Dec. 8, 2020

(54) METHOD OF FINALIZING AN AIR WAYBILL AT THE TIME OF ALLOTMENT BOOKING USING A LOGISTICS MANAGEMENT SYSTEM (LMS)

(71) Applicant: Unisys Corporation, Blue Bell, PA (US)

(72) Inventors: Susan M Dohm, Apex, NC (US); JoAnn E Jancik, Eagan, MN (US); William A Loebertmann, Eagan, MN (US); Kenneth L Hoffman, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 404 days.

This patent is subject to a terminal disclaimer.

(21) Appl. No.: 14/542,897

(22) Filed: Nov. 17, 2014

(65) Prior Publication Data
US 2016/0140495 A1    May 19, 2016

(51) Int. Cl.
*G06Q 10/08*    (2012.01)
*G06Q 30/02*    (2012.01)

(52) U.S. Cl.
CPC ..... *G06Q 10/0835* (2013.01); *G06Q 30/0283* (2013.01)

(58) Field of Classification Search
CPC ................ G06Q 10/0835; G06Q 30/0283
See application file for complete search history.

(56) References Cited

U.S. PATENT DOCUMENTS

| | | | |
|---|---|---|---|
| 8,078,485 B1* | 12/2011 | Kraehmueller | G06Q 10/063 705/7.11 |
| 2002/0059110 A1* | 5/2002 | Yamamoto | G06Q 10/08 705/26.1 |
| 2003/0014288 A1* | 1/2003 | Clarke | G06Q 10/047 705/7.26 |
| 2003/0065581 A1* | 4/2003 | Takada | G06Q 10/02 705/26.62 |
| 2011/0161241 A1* | 6/2011 | Jani | G06Q 10/08 705/338 |
| 2014/0149313 A1* | 5/2014 | Laurent | G06Q 10/02 705/36 R |
| 2014/0279661 A1* | 9/2014 | Zahn | G06Q 10/08355 705/338 |

FOREIGN PATENT DOCUMENTS

WO    WO2016019417    *    8/2017    ............. G06F 17/40

OTHER PUBLICATIONS

R.G. Kasilingam; "Air cargo revenue management: Characteristics and Complexities"; European Journal of Operational Research 96, 36-44 (1996) (Year: 1996).*

* cited by examiner

*Primary Examiner* — Kevin H Flynn
*Assistant Examiner* — Ibrahim N El-Bathy

(57) ABSTRACT

A logistics management system (LMS) may include receiving, at a server, a reservation request from a requestor for a booking on an air carrier's cargo hold for a designated route; validating, by the server, an availability of the requested booking with the air carrier; generating, by the server, a price quote for the booking; communicating, by the server, the price quote to the requestor; and receiving, by the server, an acceptance of the price and terms from the requestor to form commercial terms for the booking.

20 Claims, 12 Drawing Sheets

METHOD OF FINALIZING AN AIR WAYBILL AT THE TIME OF ALLOTMENT BOOKING USING A LOGISTICS MANAGEMENT SYSTEM (LMS)

TECHNICAL FIELD

The instant disclosure relates to a logistics management system (LMS). More specifically, the instant disclosure relates to managing allotment and booking reservation requests in a logistics management system (LMS).

BACKGROUND

An allotment is a reservation for a block of space onboard a flight for a specific period for use by a customer or station. Individual shipments are subsequently booked against the space in the allotment. A booking is an agreement to carry a shipment on a specific flight and date, and the space on the flight capacity is reduced by the weight and volume of the booking. An allotment is created as a division of the total space available within the aircraft for shipping cargo, thereby affording air carriers the ability to sell quantifiable spaces onboard the cargo holds of an aircraft. The specific characteristics and dimensions of an allotment are dependent upon several variables, including the characteristics and capabilities of the particular aircraft (e.g., the particular dawn) position of an allotment within aircraft's cargo hold may limit the allotment's dimension or weight).

Allotments are the reservations of a carrier's allotment space by a customer (e.g., agent or shipper). Customers conventionally create an allotment based upon their shipping forecasts. Previously, allotments were difficult to create and price for a given route, especially when the allotments were based upon marginally accurate shipping forecasts by customers. Further, carriers lost revenue when customers failed to fill their allotments, because allotments and bookings were only charged when the customer actually shipped their goods on the carrier's aircraft. Even further, few methods were available for amending, tailoring, or restricting allotments or bookings. Customers may make bookings to ship their freight against their allotment or against the airline's free space. The booking is a reservation for a specific shipment.

SUMMARY

Carriers prefer flexibility in the creation and management of allotment bookings. Logistics management systems (LMS) provide computing resources to process freight shipment data, and attempt to aid in scheduling, coordinating and tracking various aspects of the freight shipment. A logistics management system (LMS), in one embodiment, may be configured to enhance the creation and management of allotments and bookings.

A method may include receiving, at a server, a reservation request from a requestor for a booking on an air carrier's cargo hold for a designated route; validating, by the server, an availability of the requested booking with the air carrier; generating, by the server, a price quote for the booking; communicating, by the server, the price quote to the requestor; and receiving, by the server, an acceptance of the price and terms from the requestor to form commercial terms for the booking.

A computer program product may include a non-transitory computer readable medium including: code to receive a reservation request from a requestor for a booking on an air carrier's cargo hold for a designated route; code to validate an availability of the requested booking with the air carrier; code to generate a price quote for the booking; code to communicate the price quote to the requestor; and code to receive acceptance of the price and terms from the requestor to form commercial terms for the booking.

A system may include a memory and at least one processor. The at least one processor may be coupled to the memory. The at least one processor may be configured to receive a reservation request from a requestor for a booking on an air carrier's cargo hold for a designated route; to validate an availability of the booking with the air carrier; to generate a price quote for the booking; to communicate the generated price quote to the requestor; and to receive acceptance of the price and terms from the requestor to form commercial terms for the booking.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
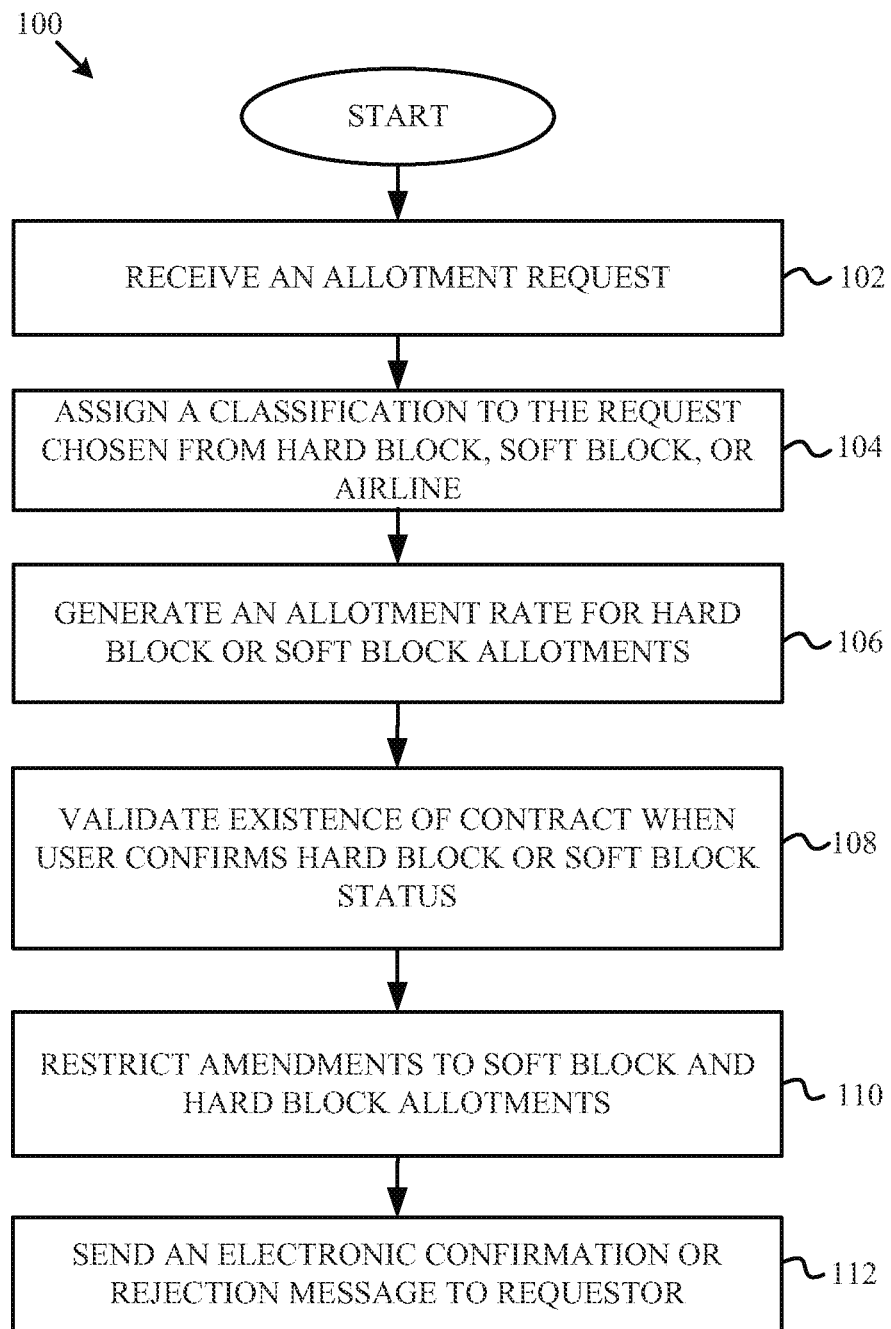
FIG. 1 is a flow chart illustrating an allotment management process with allotment classification according to one embodiment of the disclosure.

FIG. 1 is a flow chart illustrating an allotment management process with allotment classification according to one embodiment of the disclosure. The method allows a customer the ability to obtain an allotment reservation upon a carrier's aircraft. A logistics management system (LMS) is one system for creating booking reservations, which may be bookings for portions of a reserved allotment. A method 100 begins at block 102 with receipt of an allotment request. It should also be noted that the terms "customer," "shipper," "freight forwarder," or "user" may refer to the same party; however, it should be understood that when a LMS is used to perform the disclosed method, an agent—regardless if a shipper's agent, carrier's agent, or third-party agent may be entering the allotment request into the LMS, regardless if the request was received by paper, fax, email, in-person, telephonically, or other communication systems outside of a LMS's communications systems. At block 104, a classification is assigned to the allotment. The allotment classification may be received simultaneously with the allotment request, such as in cases where the allotment reservation request is sent as an extensible markup language (XML) formatted message. In one embodiment, the allotment classifications include "Hard Block," "Soft Block," and "Airline," which may represent the different characteristics of the underlying allotment contract. LMS may associate an allotment contract to a soft or hard block allotment, which allows quote routing based on the lowest of the soft or hard block rates.

A hard block classification is a reservation wherein the underlying terms of the agreement provide that the customer will pay the entire price of any unused or cancelled allotment. As a result, the allotment cannot be cancelled without penalty. However, the corresponding price for the allotment may be reduced in consideration of the shipper's inability to amend the shipment contract In this manner, the hard block allotment category incentivizes shippers to fill their shipping reservations on carriers. It also incentivizes shippers to keenly forecast their shipment requirements. In return, the shipper is provided a reduced shipping price for committing to the allotment reservation. In another embodiment, a failure of a shipper to fulfill their hard block allotment may result in a penalty fee in addition to or in lien of payment of the allotment price.

A soft block allotment classification is a reservation similar to a hard block reservation, but wherein the underlying terms of the agreement provide that the shipper will only pay a portion of any unused or cancelled allotment.

An airline allotment reserves the allotment for the carrier. The airline allotment does not restrict the allotment reservation, thereby allowing the air carrier to further amend or delete the allotment reservation. Further, the carrier may later choose to cancel the airline-classified allotment reservation, thereby making the allotment available to other shippers.

It should be understood by a person of ordinary skill in the art that other allotment categories may be added to reflect the contractual terms between shippers and carriers. It should also be understood that the LMS restrictions created by the current hard block, soft block, and/or airline categories may be amended based upon the terms of an underlying contract between a shipper and a carrier.

In some embodiments, for hard block and soft block allotments, if the allotment is deleted by an authorized user, the entire allotment is deleted, including any split periods that exist. Further, a deleted allotment cannot be reactivated for hard and soft block allotments.

At block 106, if a hard block or soft block allotment reservation is requested, an allotment contract rate is provided to the user. In various embodiments, the allotment contract rate may become the contract price if the user confirms the hard block or soft block status as shown in block 108.

In some embodiments, when an allotment reservation C$ALCO, parameter is set to "Y" and the allotment reservation is a hard block allotment (and the allotment reservation is being created/updated, but not yet confirmed), LMS performs the following steps to calculate the Hard Block Total Due (or price quote based on allotment rate):

1.) LMS retrieves the contract using the most current version of the allotment contract to get the contract rate. If the allotment contract does not exist, an error is returned.
2.) The allotment contract rate is multiplied by the allotment weight to calculate the Hard Block Total Due for each day of the allotment date range.
3.) If the contract is updated after the Hard Block Total Due is calculated, LMS does not automatically update the allotment's Hard Block Total Due field. The user may procedurally update the allotment, and LMS does update the Hard Block Total. In some embodiments, the user is reminded by a message to update the allotment, as required, after updating the allotment contract.

In certain embodiments, allotments with a selected hard block or soft block category parameter require an allotment contract. At block 110, the existence of a contract is validated. LMS may check with a Rating module to determine if an allotment contracts exists. When the allotment reservation is confirmed and for hard or soft block allotments the allotment contract exists the LMS may send a confirmation (or rejection) email to the customer. An exemplary parameter for selecting such hard block or soft block (as opposed to an airline allotment classification) may be the "C$ALCO" parameter described earlier, which when set to "Y" mandates a contract for all non-airline allotments (e.g., hard block and soft block allotments). The carrier associates the contract to the requested allotment within the Allotment Information function of EMS, which may be accomplished by entering a contract number. When the C$ALCO parameter is set to "Y," the allotment contract may have a single fixed rate, which may apply to all products that are allowed to have allotments. When an allotment contract is created with a classification of hard block or soft block, the LMS may validate that the contract has one rating line and a fixed rate. This validation step may be performed when an Allotment Information "Create" or "Update" button is clicked, or alternatively, a "Send Email" button is clicked. In certain embodiments, two options allow a user to ensure that a hard block or soft block reservation is confirmed for an underlying contract. Under one option, the user does not create the contract until the allotment and financial terms are agreed upon with the customer (e.g., freight forwarder). The user may create the allotment contract just before confirming the allotment. Under another option, the user may create the allotment contract before confirming the allotment, but enters an Effective Date for the Contract that is for next year. When the user is ready to confirm the allotment, the user first changes the Effective Date of the Contract to be the current year and then confirms the allotment. Finally, at block 112, an electronic confirmation or rejection message may be sent to the requestor.

Figure 2:
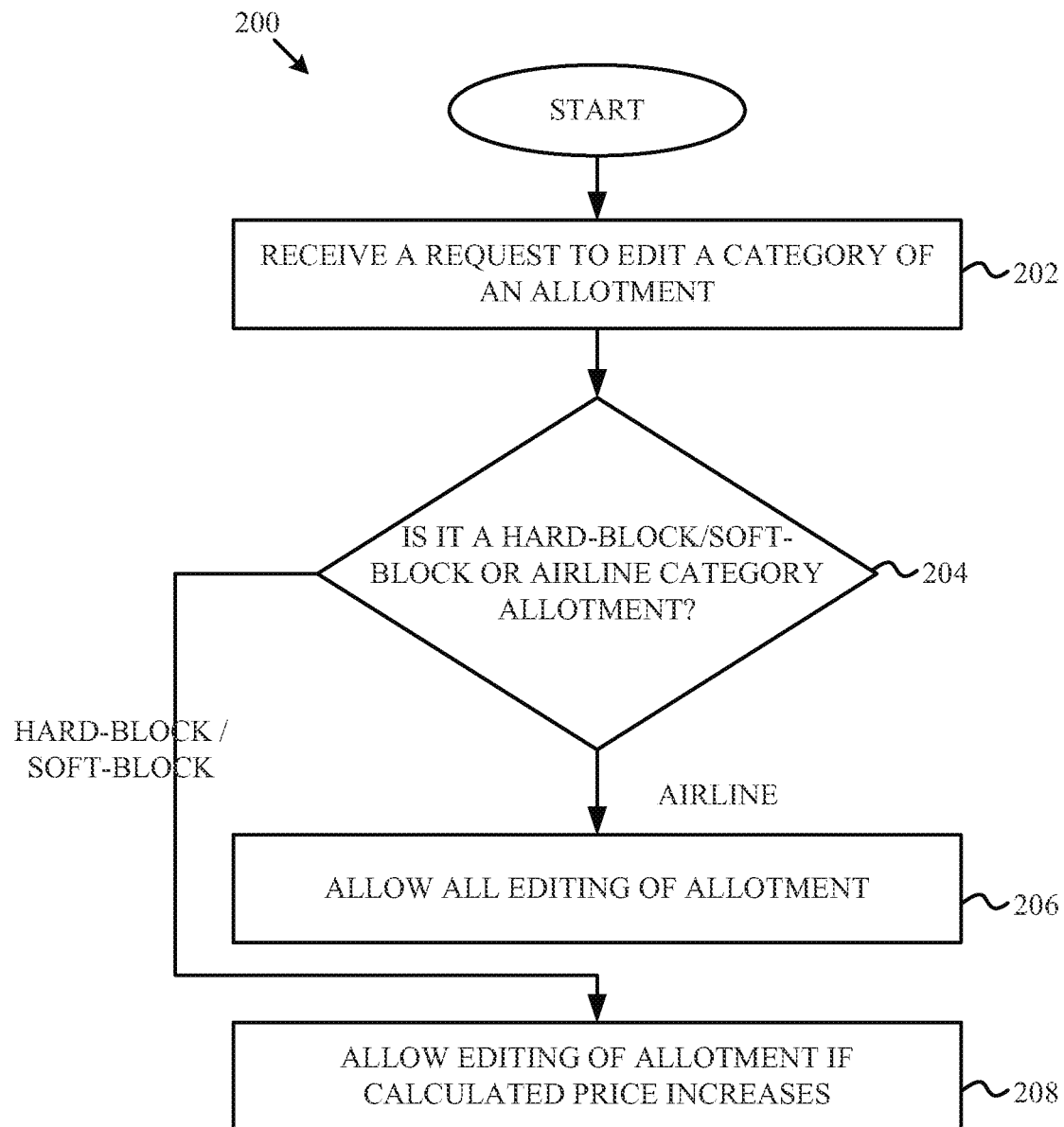
FIG. 2 is a flow chart illustrating processing of a request to edit an existing allotment according to one embodiment of the disclosure.

FIG. 2 is a flow chart illustrating processing of a request to edit an existing allotment according to one embodiment of the disclosure. Modifications to allotments may be allowed or disallowed based on a category assigned to the allotment. A method 200 begins at block 202 with receiving a request to edit an allotment. At block 204, it is decided whether the allotment is a hard block, soft block, or airline category allotment. No change is allowed to the category of an existing allotment. If the allotment is determined to be a hard block or soft block at block 204, the method 200 continues to block 208. At block 208, editing of the allotment corresponding to the received request of block 202 for category hard block or soft block allows field updates such as approximate flight departure time and change allotment deadline that are valid only for soft block and hard block allotments. If the reservation is airline at block 204, then the method 200 continues to block 206. At block 206, editing is allowed of the allotment data allowed for category airline allotment corresponding to the request received at block 202. As shown in method 200, hard block and soft block allotments may be restricted from amendments by users through the use of decision block 204.

In one embodiment, rather than charge a customer when the customer makes changes to an allotment, the customer may be charged a fee for under-tendering an allotment. With under-tendering, the LMS may continue to calculate the weight charges for the amount of the greater of dimensional or gross weight of the allotment and store this as the total due amount on the allotment. After the flight departs, LMS may accumulate the tendered weight charges of all the bookings against that allotment and then, if a soft block then charge the customer for a percentage of the under-tendered amount (total allotment due minus the accumulated weight charges of the applicable bookings), or if a hard block then charge the customer for the under-tendered amount (total allotment due minus the accumulated weight charges of the applicable bookings).

Figure 3:
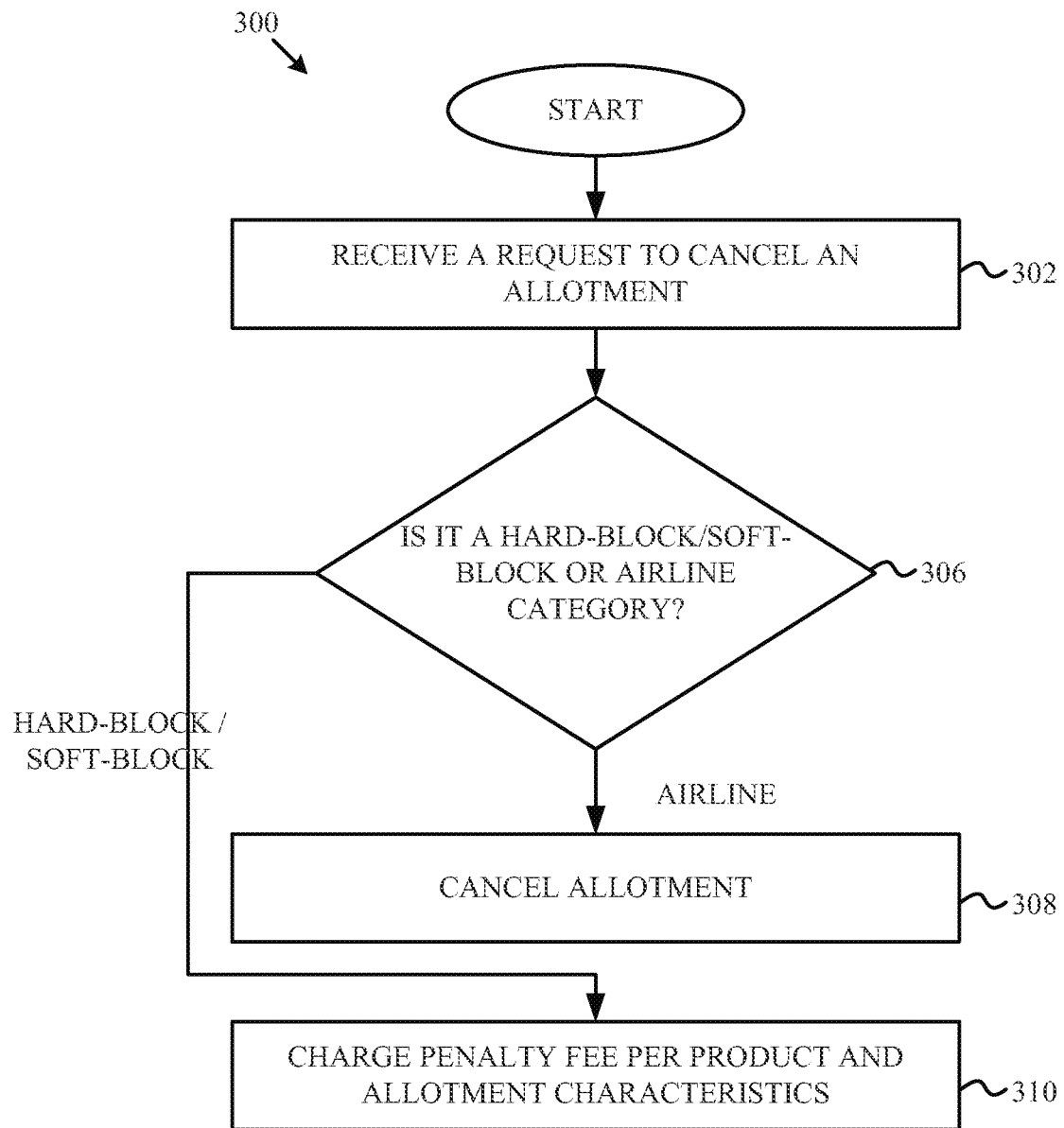
FIG. 3 is a flow chart illustrating processing of a request to edit an existing allotment according to one embodiment of the disclosure.

FIG. 3 is a flow chart illustrating processing of a request to cancel an existing allotment according to one embodiment of the disclosure. A method 300 begins at block 302 with receiving a request to cancel an allotment. At block 306 it is determined whether the allotment is a hard block, soft block, or airline category allotment. If determined to be a hard block or soft block then the method 300 continues to block 310 to charge a penalty fee according to product and/or allotment characteristics. In one embodiment, LMS may be configured to only charge a fee if the booking is not against an allotment. In one embodiment, a charged penalty may be based on the product, rather than the contract terms. If determined to be an airline category then the method 300 continues to block 308 to cancel the booking. As shown in method 300, hard block and soft block booking may be restricted from amendments by users through the use of decision block 306.

Figure 4:
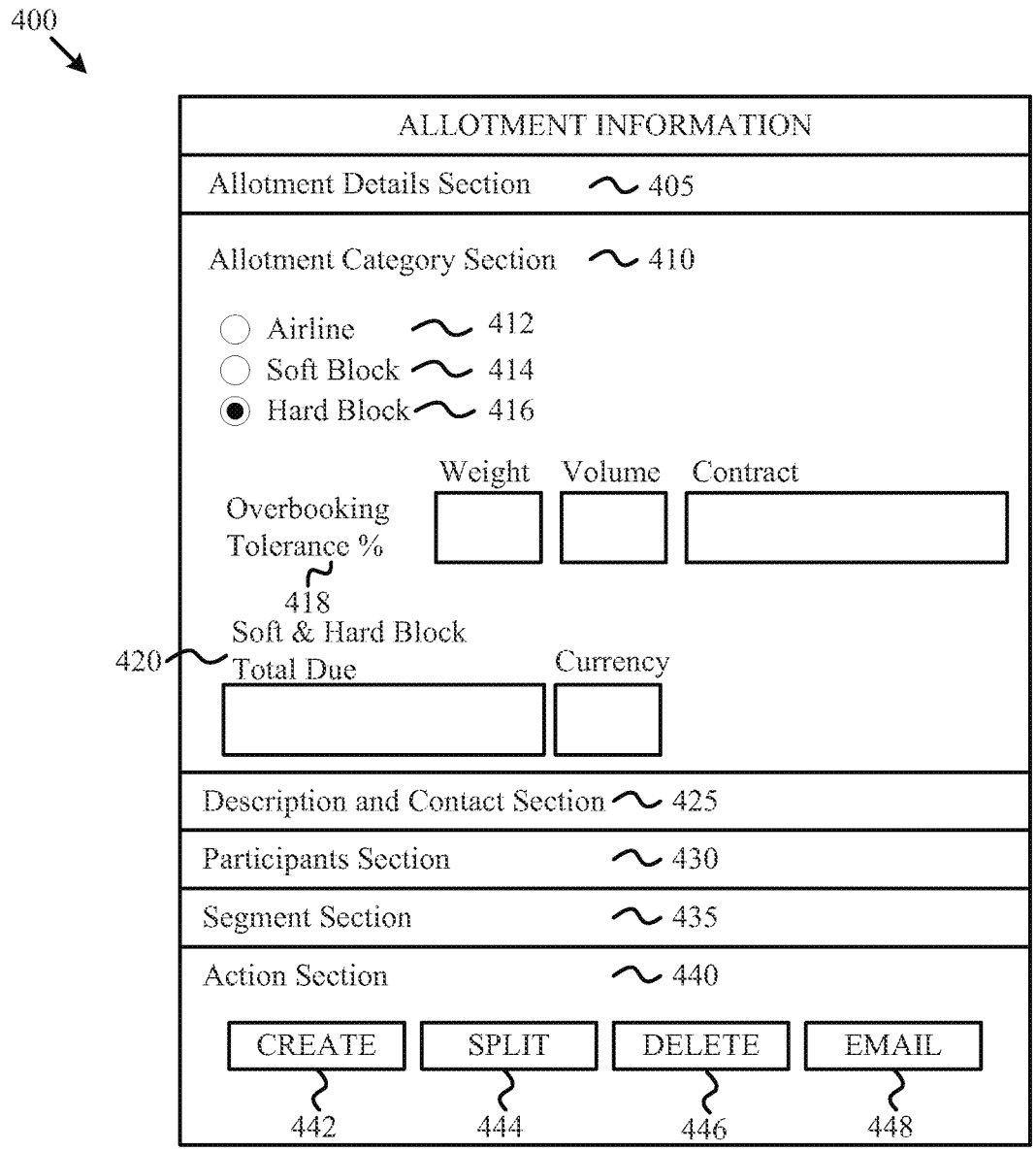
FIG. 4 is a block diagram illustrating a display for classifying allotment information according to one embodiment of the disclosure.

FIG. 4 is a block diagram illustrating a display for classifying allotment information according to one embodiment of the disclosure. The allotment details section 405, which may include the details of the route and the allotment. These route and allotment details may include whether the allotment is a single day allotment or multiple day allotment, which days the allotment applies to for multiple day allotments, the enforcement of hurdle rates, the weight and/or volume of the shipment, quantities of pallets and/or containers (if any), the route origin, the route destination, the effective date range, any auto-allotment release (default, manual, control, or disable), priority, and whether overbooking is allowed (not shown) The allotment category section 410 may allow a user to select the allotment category airline 412, soft block 414, or hard block 416. In one embodiment, LMS rules may be configured such that soft blocks are similar to hard blocks for the Total Due, except the soft block only charges a percentage of the Total Due. The section 410 may also include fields for soft block percentage due, approximate flight departure time, change allotment deadline, allotment total due, and/or dimensional weight. Further, a user may input the overbooking tolerance details 418, which includes the shipment weight, volume, and shipper's contract code. The allotment category section 410, also includes the hard block total due 420, which includes identification of the currency. The description and contact section 425 may include the contact name, phone number, email address, description, and remarks related to the allotment (not shown). The participants section 430 may identify the parties types involved (e.g., shipper and agent), their account code, name, and station (not shown). The segment section 435 may include information about the flight, including arriving flight code, days of flight operation, segment and flight, days of displacement, flight controlling station, request allocation code, space allocation code, and whether it is a split allotment segment (not shown).

In some embodiments, a LMS is configured to allow a customer or carrier to select a particular contract for pricing a booking according to one embodiment of the disclosure. The LMS may be configured to validate that the selected contract matches the characteristics of the air waybill. By allowing the selection of particular contracts, the LMS may support campaign rates.

Campaign rates refer to special rates, which are directed to specific customers for particular routes and flights. Campaign rating may provide the ability to sell specific routes at a given time to targeted customers within short notice and/or may provide the airlines the ability to improve cargo capacity utilization. Campaign rating may also provide the airline with the flexibility to give preferential rates to customers booking via the Portal, to a group of participants (using existing group contract functionality), or to a specific participant.

In some embodiments, campaign rates are handled as contracts and the campaign code is entered in the existing Contract To Apply field on a Routing and Price function. In various embodiments, the Contract To Apply parameter may be added to different LMS functions, to include without limitation the Rate and Quote Information, Price Booking Information, AWB Information, Express AWB and/or Archive AWB Information functions. In further embodiments, LMS may be configured to support transferring the Contract To Apply value that is entered on Routing and Price, Rate and Quote Information and Price Quote (or similar function) to the Booking Information and AWB Information functions, and is used in pricing from those functions. Some embodiments of a LMS may be configured to preclude a campaign contract from being applied during pricing. In one embodiment, a LMS may apply the campaign contract if the contract number is entered in the Contract To Apply fields on the functions that perform pricing.

The LMS's Contract To Apply feature may be controlled by a Campaign Rating parameter. The parameter C$CAMP is one example of a Campaign Rating parameter. In various embodiments, the Campaign Rating parameter may control whether the Contract To Apply field is displayed and whether the value entered in the Contract To Apply field is used for pricing. When a non-existent contract is entered in the Contract To Apply field, a LMS may be configured to return an error message regardless of the value of the Campaign Rating parameter.

In situations where the Campaign Rating parameter is not selected (e.g., an entry of "N"), campaign functionality is not enabled. In some embodiments, not enabled is the default value for the Campaign Rating parameter. When the Campaign Rating parameter is not selected, the Contract To Apply field is not displayed on various pricing functions, which may include the Rate and Quote Information, Price Quote, Booking Information, Express AWB, AWB Information and/or Archive AWB Information functions. When a Contract To Apply is entered on Routing and Price or is sent in an XML message, a LMS may be configured to ignore the contract for pricing, and thus, ignore any Contract To Apply selection.

In situations where the Campaign Rating parameter is selected (e.g., an entry of "Y"), campaign functionality is enabled. When the Campaign Rating parameter is selected, the Contract To Apply field is displayed on various pricing functions, which may include the Rate and Quote Information, Price Quote, Booking Information, Express AWB, AWB Information and/or Archive AWB Information functions. In some embodiments, the Contract To Apply may be optional on certain pricing functions when a Face rate is selected. Such pricing functions may include Price Quote, Booking Information and AWB Information.

Later, the Contract To Apply may be displayed and protected in these functions when the Published and Actual rates are selected. In other embodiments, the Contract To Apply may be optional on the Express AWB, which displays the Face rate. Additionally, the Contract To Apply may be an optional field on an Archive AWB Information function.

When the Campaign Rating is enabled and a particular Contract To Apply is selected, the contract pricing feature of a LMS may exclude other contracts or spot rates, even if they are cheaper. Instead, a LMS will apply the contract entered in the Contract To Apply field. For XML messages, pricing uses the contract number in the XML message, which processes the same way as pricing from Booking Information with the number in the Contract To Apply field. If the contract in the Contract To Apply field cannot be applied for the Actual rate on any rating line of the air waybill, a LMS may be configured to return an error message.

Figure 5:
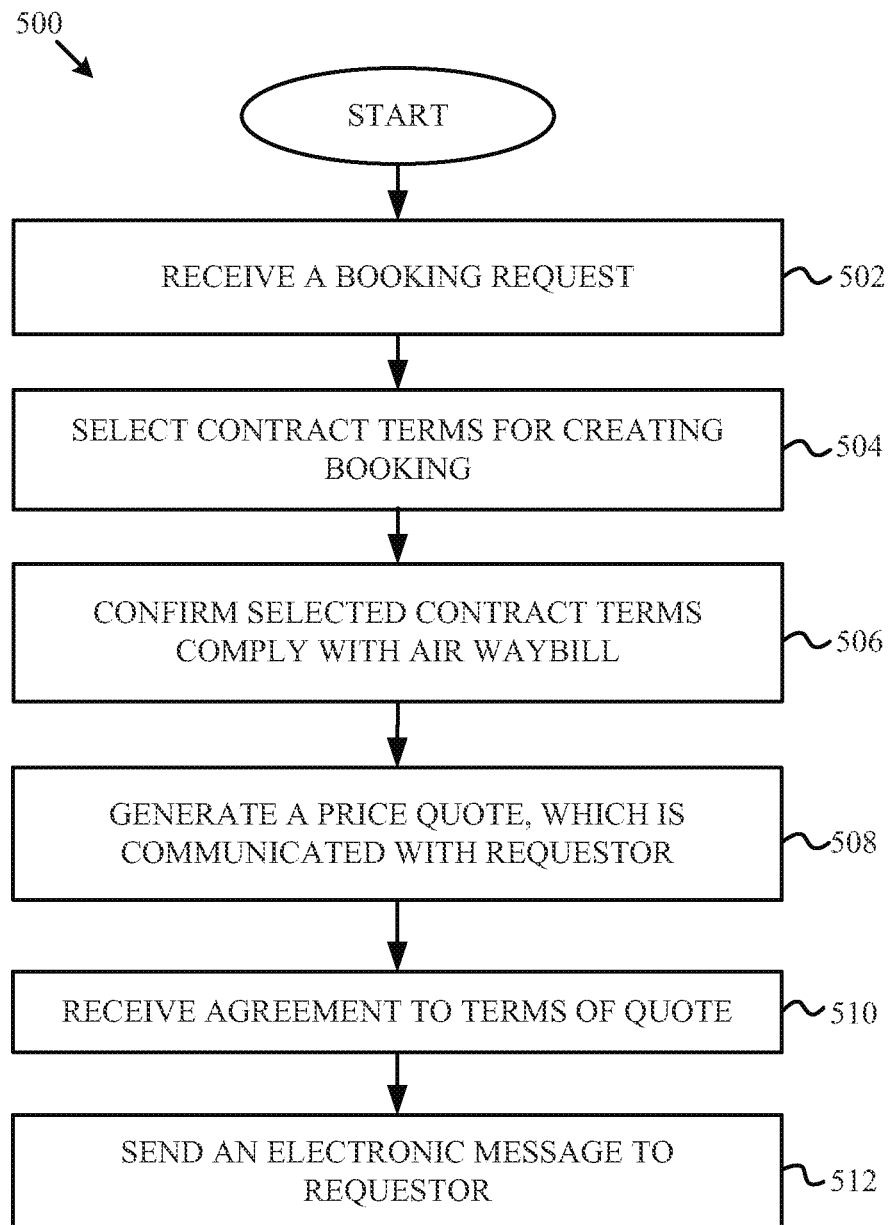
FIG. 5 is a flow chart illustrating the selection of a contract for a booking according to one embodiment of the disclosure.

FIG. 5 is a flow chart illustrating the selection of a contract for a booking according to one embodiment of the disclosure. In some embodiments, the method 500, begins at block 502, where the LMS provides a list of a pre-existing agreements between the customer (e.g., freight forwarder) and the carrier. The LMS may provide the list of agreements when a booking is being created, e.g., block 102, or the LMS may provide the list of agreements at other functions, including without limitation the Rate and Quote Information, Price Quote, Booking Information, Express AWB, AWB Information, and/or Archive AWB Information functions. The pre-existing agreements are generally contracts that have been created between the customer (e.g., freight forwarder) and carrier. The agreements may also include campaign rates, as described above, and other related promotions or offers from the carrier, which won't necessarily have resulted in a contract (e.g., no acceptance of an offer, etc.). In other embodiments, the LMS may receive a manual entry of an identified for a contract from a user. At block 504, a user of the LMS (i.e., requestor) selects the appropriate agreement to apply to the booking. At block 506, the LMS may, optionally, validate that the selected agreement may be used for the particular routing, date, booking, etc. At block 508, the LMS assigns the terms from the agreement to the booking request, which then uses the commercial terms from the agreement to generate a price quote, as shown at block 510. The price quote may be communicated with the requestor. Optionally, the LMS may block the terms from non-selected agreements from being assigned to the booking. This blocking step may be completed at the time the booking is requested or later (e.g., the requestor accepts the price quote). When no specific contract is selected for reservation booking, the terms of the contract having a lowest cost when applied to the booking may be used to generate a price quote for the booking.

In some embodiments, the LMS provides a mechanism to finalize an air waybill "Contract for Carriage" at the time of booking instead, of only allowing the finalization of the air waybill "Contract for Carriage" terms at the time the shipment is tendered to the carrier at the route origin. As a result, the carrier may specify by product whether to finalize the Air Waybill "Contract for Carriage" terms at the time the booking is confirmed by the carrier. When the routing is priced with an allotment contract on the Routing & Price function, LMS is enhanced to display the Allotment ID and Allotment Category (classification of soft block, hard block, or airline) based on the user's List Preferences.

Figure 6:
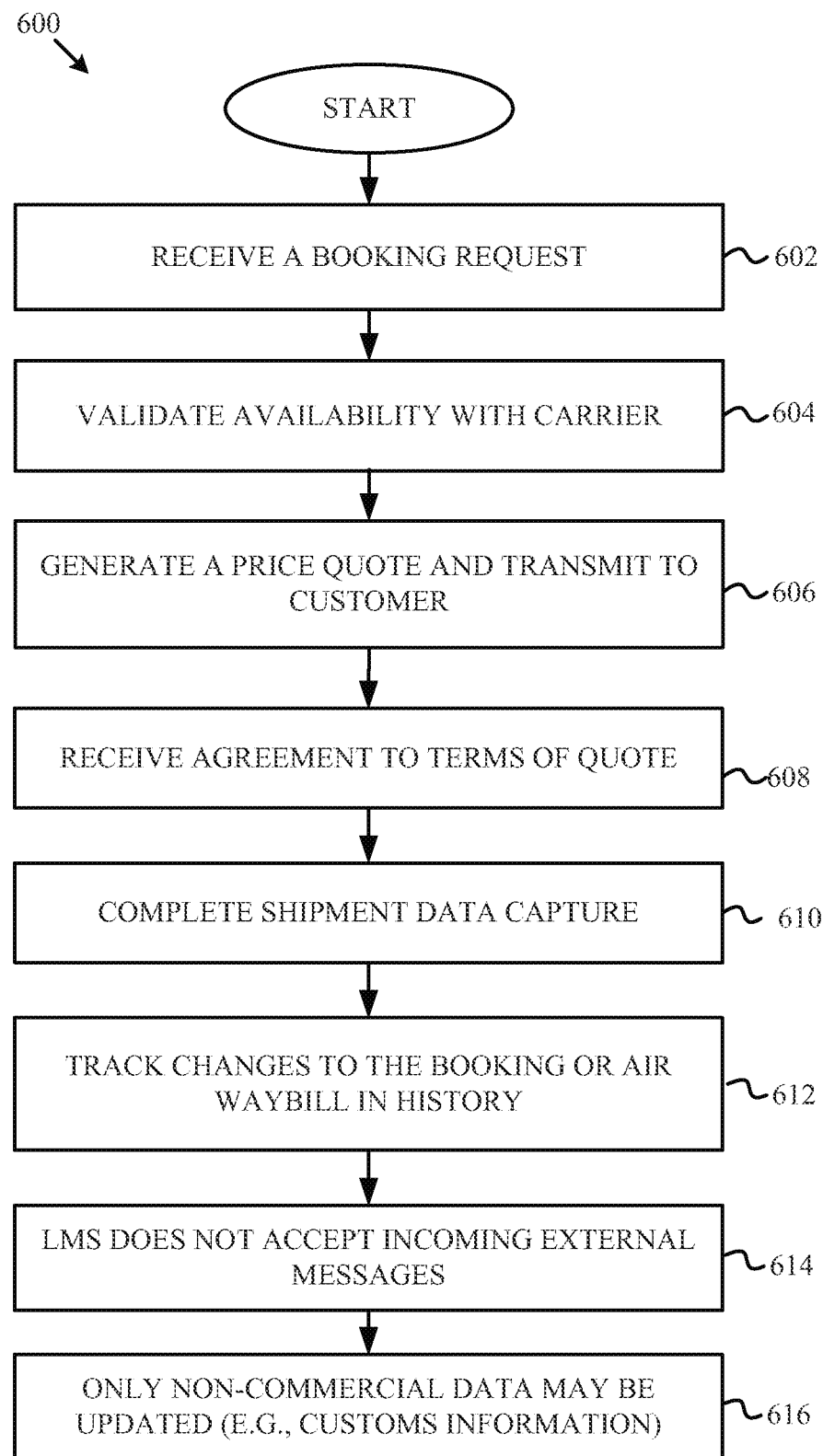
FIG. 6 is a flow chart illustrating a reservation process providing early contract for carriage finalization according to one embodiment of the disclosure.

FIG. 6 is a flow chart illustrating a reservation process providing early contract for carriage finalization according to one embodiment of the disclosure. In some embodiments, the method 600 begins at block 602, where a request is received for a booking on a carrier's designated route. Before the booking can be finalized, the carrier may be required to first confirm that the allotment is available upon the designated flight at block 604. After the carrier has confirmed the availability of the allotment aboard the designated route, the customer is provided an allotment contract rate at block 606. At block 608, the customer agrees to the terms of the quote, including the allotment contract rate. Upon the customer agreeing to the terms, the shipment data is captured at block 610, after which any changes to the shipment data is tracked in history at block 612. Further, in various embodiments, the LMS may be set to not accept incoming external messages, and optionally, may only allow non-commercial data to be updated. An example of non-commercial data may be the customs information associated with the shipment.

In one embodiment, the LMS may allow a user to navigate to the Bookings for Allotments function from a Context Menu to view the remaining allotment space for a specific allotment and date, and then return to the Routing & Price function to select the routing/product to make the booking, or select a different routing/product. In some embodiments, the user selects a routine/product to create a booking, upon which the new fields on Routing & Price (not shown) are passed and populated in the Booking Information function's associated fields. These fields may include Air Waybill Number, Participants, Allotment ID, Allotment Category, Dimensions, Contact, Phone, Email, Currency, and Pricing Date.

When an air carrier confirms space availability and provides an allotment rate at the time of the request, and the customer (e.g., freight forwarder) agrees to the terms of the quote, the airline may consider the event the time of shipment data capture. Once the shipment data is captured, changes to the booking or the air waybill may be tracked in the LMS's history. One method for providing such shipment data capture at time of booking involves the use of the parameter C$BSDC. When C$BSDC is set to "Y," shipment data capture (SDC) can be completed at time of booking based on a "SDC Completed By" field. The C$BSDC parameter is used by LMS if the field is set to Y. In situations where parties are not participating in Commercial Control on Bookings, an exemplary LMS disregards any rules controlled by the C$FCBK (commercial control on bookings) parameter being set to "T" or "Y," and the C$BSDC parameters. When C$BSDC is set to "Y" and the product's SDC Completed By parameter is set to booking, a LMS may process air waybills at the time of booking, and further, the Air Waybill processing called by an incoming external messages or from the AWB Information function may operate as a secondary data capture instead of the main data capture. In an LMS, the air waybill entry may be accepted on an AWB Information function or the incoming messages; however, it does not designate the SDC Complete. In cases where the booking does not exist, the user cannot create an air waybill from the AWB Information function. As soon as the product is entered, and it is a product with SDC Completed By is set to Booking, the function protects the remaining commercial fields, thereby precluding changes to the commercial data. In cases where the booking does exist, many, if not all, commercial fields are display only (i.e., protected from amendment) and user may only enter and update non-commercial values, such as customs information. Once the booking is created, SDC is completed at the time of booking, and the booking (e.g., air waybill) is locked, an exemplary LMS may accept incoming external messages, which are recorded in an AWB History to show discrepancies. Notable fields for potential discrepancies are face value pieces, weight, and volume.

In some embodiments, the user may specify the shipper, any consignee, the route, and/or the pricing when selecting a routing/product to create a booking. In other embodiments, agent information may also be included. Further, the information related to the party responsible for paying may be included. Pricing comprises the costs and charges of the actual transportation, but may also include any other incidental costs and/or charges, to include without limitation fuel surcharges, security surcharges, storage fees, taxes, etc.

When the parameter "SDC Competed By" is set at the time of booking and the booking (i.e., air waybill) is locked, the LMS may not accept updates from external channels (e.g., airline portal, external messages) and return an error to the requestor. An air waybill may be locked manually by a user using an air waybill sub-function, such as after the air waybill entry is completed and details of the air waybill have been captured including routing, participants, and pricing details. An air waybill may also be locked automatically based on various system parameter settings.

Further, the LMS may also return an error to the requestor after the Latest Acceptance Time (LAT) or the goods are tendered for shipment. The LMS may update the commercial values of the booking when the air waybill is locked. In such cases, an exemplary LMS may create a CCA. A CCA is a charge correction advice (CCA), which may be generated and used as an advice notice when updates to an air waybill are made that modify the charges. In some embodiments, a CCA may only be generated after an air waybill is locked. In cases where amendments to the booking would normally result in a lower price, the Actual rate lines are retained. The LMS may record the changes to the commercial fields on a Booking Information function and incoming FFR/WFR messages into Booking History before the booking (e.g., air waybill) is locked.

In some embodiments, the LMS may provide the carrier the ability to charge the shipper the higher rate if a booking is updated, which is referred to as the "Retain Highest Price" rule. As a result, the Retain Highest Price rule may preclude the price for the booking to be lower than the price originally quoted to the customer at the time of booking. Further, the rule allows the carrier to allow changes to current reservations which previously would have resulted in a reduced price if the cargo weight and/or volume was decreased while maintaining the original price.

Figure 7:
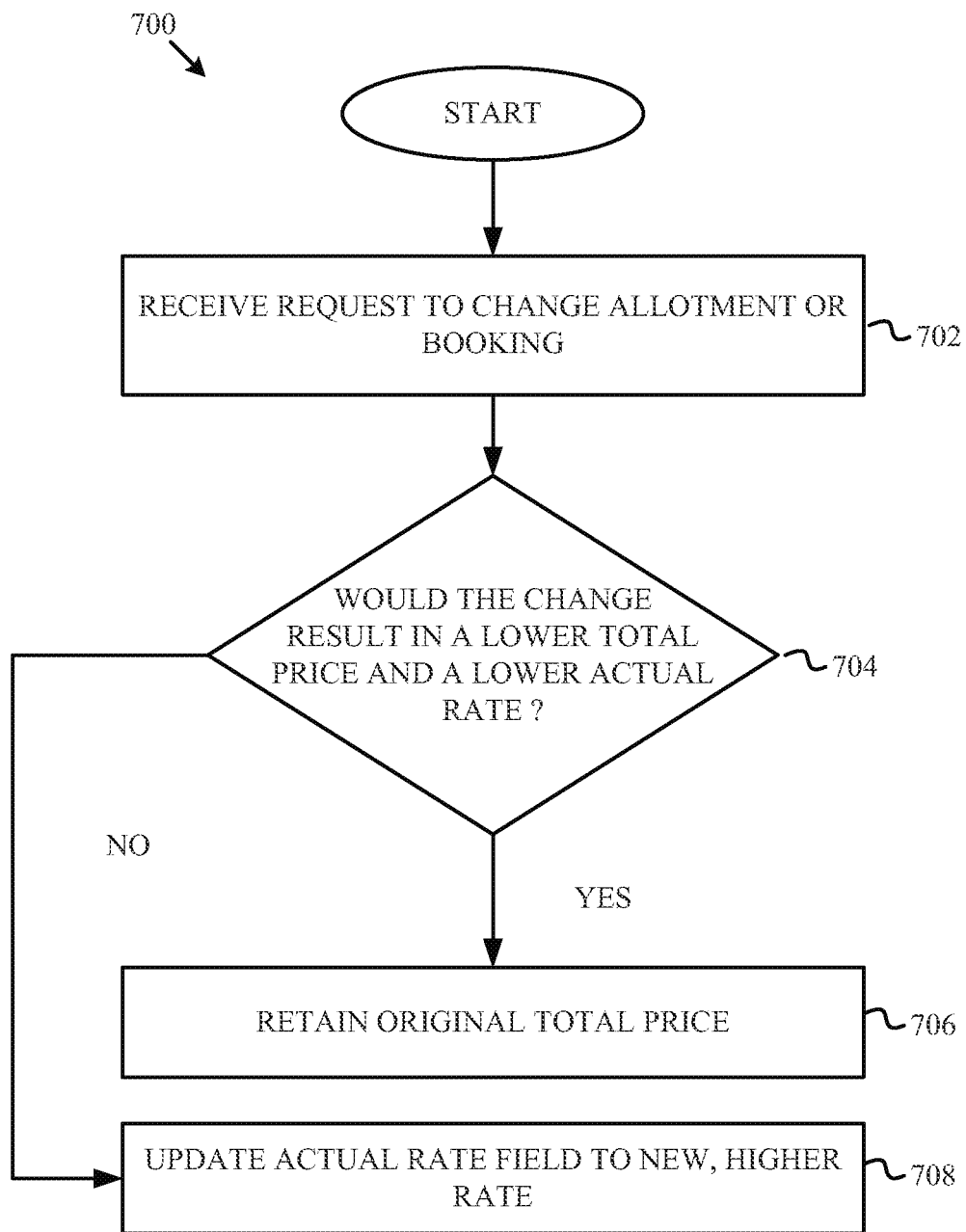
FIG. 7 is a flow chart illustrating a reservation process maintaining the highest shipping price according to one embodiment of the disclosure.

FIG. 7 is a flow chart illustrating a reservation process maintaining the highest shipping price according to one embodiment of the disclosure. A method 700 begins at block 702 with receiving a request to change a booking. At block 704 it is determined whether the change requested at block 702 would result in a higher or lower actual rate. If a lower rate would result at block 704 then the original actual rate is retained at block 706. If a higher rate would result at block 704 then the actual rate may be updated to the higher rate at block 708. Although "actual" rates are referred to, "actual" rates may be any commercial rate, such as face value, published value, and/or actual value.

In some embodiments, the Retain Highest Price rule is implemented when the booking is updated. It should be understood that the feature may be overridden by administrators, as required. Further, this Retain Highest Price rule may operate independently or in conjunction with the assignment of classifications.

In some embodiments, a LMS provides the ability to charge a requestor (e.g., freight forwarder) a penalty fee if an allotment or booking is updated. As a result, customers (e.g., freight forwarders) are incentivized to accurately predict their shipping requirements at the time of the allotment or booking. In some embodiments, new fees will be assessed to the customer when they make changes or cancel the allotment or booking. In certain of these embodiments, these fees will be assessed by creating a supplemental air waybill.

Figure 8:
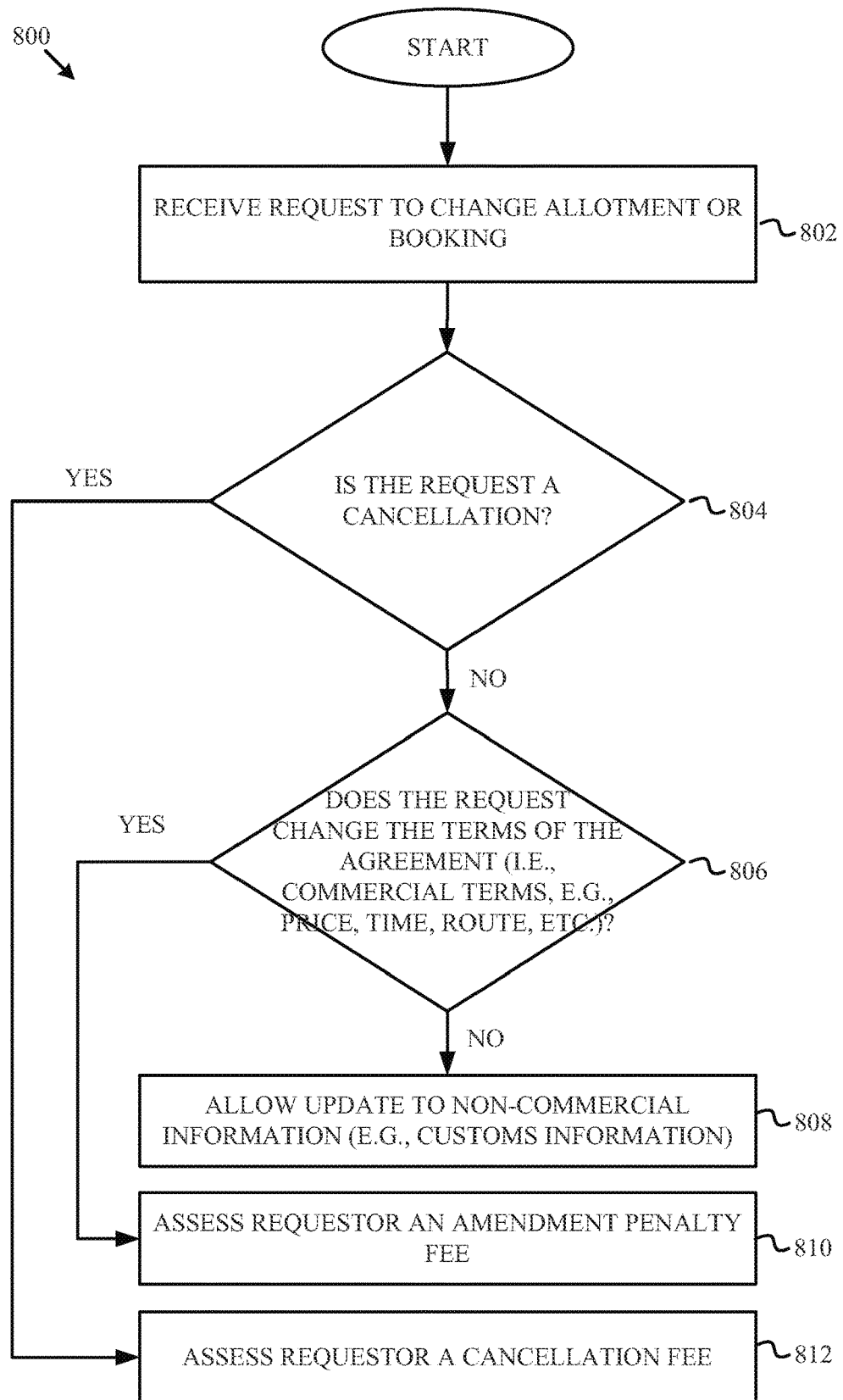
FIG. 8 is a flow chart illustrating a reservation process in which a penalty fee is assessed against a customer (e.g., freight forwarder) according to one embodiment of the disclosure.

FIG. 8 is a flow chart illustrating a reservation process in which a penalty fee is assessed against a customer (e.g., freight forwarder) according to one embodiment of the disclosure. A method 800 begins at block 802 with receipt of a request to change a booking. At block 804, it is determined whether the change is an outright cancellation or a request to amend the terms of the reservation. If the request is an outright cancellation, the requestor is charged a cancellation penalty fee based on the product and reservation characteristics. If the request is not an outright cancellation, it is next determined at block 806 whether the change request alters any contractual or commercial terms of the reservation. In some embodiments, such commercial terms include changes to the route origin, route destination, route date, booking priority, booking weight, booking volume, or any other term that is used to generate a booking rate. If the request to change the reservation would alter the commercial terms of the reservation, an amendment penalty fee is assessed against the requestor (e.g., freight forwarder) per the terms of the agreement at block 810. In the case where only non-commercial terms are requested to be amended, a penalty fee may not be incurred, at block 808. Further, certain non-commercial amendments may be beneficial to the air carrier, such as updating the customs information for the shipment. In one embodiment, carriers may also charge for changes to non-commercial terms in order to deter freight forwarders from making amendments to their reservation, such as changing the name of the recipient of the shipment at the route destination after the reservation is originally created.

The Booking Change and Cancellation fees may be controlled by the C$FCBK—Main Controlling Commercial Control Parameter on Bookings being set to T or Y, and the C$BSDC—Shipment Data Capture Complete at Booking being set to Y, the C$BKFE—Booking Fee Parameter being set to Y, and the new Online Maintenance: Fees for Products setup for the product. Only responsible participants for the prepaid charges that are participating in the Commercial Control on Bookings feature can be charged the applicable Booking Change and Cancellation fees. A C$BKFE—Booking Fee parameter controls whether a booking change or cancellation fee is automatically generated into a supplemental air waybill. This parameter may be dependent on C$FCBK being set to T or Y, and C$BSDC being set to Y.

In one embodiment, when the results from determining whether Qualify the Booking Characteristics indicate a Booking Cancellation fee is to be charged, LMS uses the associated Other Charge Code and Subcode matching to the booking's characteristics to price the Booking Cancellation Fee following existing rules for pricing other charges, which may include using other charge contracts.

In one embodiment, a customer may be charged a booking fee (e.g., charge or cancellation) only when the booking is not against an allotment. The reason being that if the booking is against an allotment, the customer is already under the allotment under-tendering agreement as described in FIG. 2 so the airline will not double charge the customer for making changes to bookings against the allotment and also charge for under-tendering.

In some embodiments, a LMS provides the ability to generate allotment rates for each route in which the quote satisfies the dynamic hurdle rate. The hurdle rate may be based upon rates dynamically generated by the Cargo Revenue Management (CRM) application at the time of booking, which is based upon the real-time available capacity. For products using dynamic hurdle rates, a Routing and Price service may fetch dynamic hurdle rates instead of using a static LMS Hurdle Rate table. In one embodiment, the LMS uses a Dynamic Hurdle Rate Interface (by setting a C$CRMD parameter to 'Y') when the product indicates that dynamic hurdle rates are to be used based on the product's 'Enforce Hurdle Rates' field setting on the Online Maintenance: Product Code Attributes function. An LMS Booking process may perform individual service requests to a Cargo Revenue Management (CRM) application when dynamic hurdle rates are required for each route and product based on flight, date, segment, and/or product. The LMS may obtain dynamic hurdle rates for all the route/product combinations that require them from CRM in one request.

In some embodiments, the LMS gathers dynamic hurdle rates for products requiring dynamic hurdle rates. This allows the allotment contract rate quoted on the LMS Routing and Price to be the same result as on the LMS Booking function, which uses dynamic hurdle rates. When there are multiple routes and products for each route, repeatedly requesting the dynamic hurdle rates from CRM for a single route and product can degrade the performance of Routing and Price. In order to improve performance when dynamic hurdle rates are required, the Routing and Price function may be changed to process the request for dynamic hurdle rates by obtaining dynamic hurdle rates for all the route/product combinations from CRM in one request. The LMS may provide the same results in regards to the pricing and hurdle rate check in Routing and Price as that received by the Booking process. If the routing and product passes the hurdle rate check on Routing and Price, it will also pass the check on Booking Information and Portal equivalent.

A hurdle rate may be a simple rate per unit of weight by product type and booking segment. The hurdle rate is the floor minimum above which a shipment rate must be charged for the shipment to be profitable. The hurdle rate can be calculated as an average by product and booking segment and does not consider complex rating for shipper-loaded ULDs, commodities, class rates, mixed consignments, and RCPs.

The hurdle rate provides useful information to airlines that can assist in the optimization of revenue streams by determining whether to accept a cargo shipment. For example, revenue relating to a cargo shipment are split between carriers according to a special prorate agreement (SPA), or using the Great Circle Mileage proration method. Thus, the known amount an airline will receive for handling the cargo shipment for a segment of the entire shipment may be difficult to determine ahead of time. Prorating shipment costs may be performed in a logistics management system (LMS) before acceptance of a package for delivery at the time of the booking reservation. By prorating upfront, the LMS may optimize airline revenue by determining whether a particular package is profitable. In certain situations, a SPA may determine how the revenue for a package is split, and the LMS may apply the agreement to calculate a particular airline's revenue from the package. The revenue may be compared to criteria to determine whether to accept a package. For example, the revenue may be compared to a hurdle rate to decide if the shipment is profitable and should be accepted. A proration module in an LMS may have some or all of the following features for interline proration. Proration may be calculated using SPAs, if one exists for the carrier and segment specified on an air waybill. If no SPAs exist, then mileage based upon an established calculation may be used (e.g., Great Circle). If an SPA is found, then the SPA defines the amount based on the published rate that must be paid to the airline. To determine the host's revenue this amount may be subtracted from the gross actual revenue. According to one embodiment, an SPA cost, when defined on the per kilogram basis, may be calculated using the actual chargeable weight. The actual chargeable weight may be the highest of the gross weight or dimensional weight unless the pricing module determines that a higher weight break applies. If an SPA is not found, then mileage based on the great circle calculation may be used. Mileage determines the percentage of distance the host and airline carry the shipment. The percentages are then applied to the published rate to determine the amount owed the airline. This amount is then subtracted from the gross actual revenue to determine the host airlines revenue.

There are three components to cargo revenue management that may be used by LMS during the booking confirmation processing: forecast the future flight capacity available for cargo (Flight Capacity Forecast), determining the host revenue and yield for the shipment. (Proration of Revenue), and forecasting the bid prices (hurdle rates) for controlling access to capacity. This information may also be used by other logistics business functions, such as during negotiations of allotments, spot rate agreements, and contracts.

An external Cargo Revenue Management (CRM) application may apply advanced statistical algorithms to historical data provided by LMS and the airline's data warehouse, in order to forecast both customer demand for the airline's products and future available capacity. Based on these forecasts, CRM may determine the bid prices, such as hurdle rates. By basing LMS flight controls on optimal decision rules, CRM leverages existing LMS features to increase airline revenues. The CRM hurdle rate is defined as the minimum acceptable rate at which the product is to be sold for a booking segment. The hurdle rate may be calculated as the floor minimum above which a shipment rate must be charged for the shipment to be profitable. The hurdle rate may be calculated as an average by product and booking segment and may not consider complex rating for shipper-loaded ULDs, commodities, class rates, mixed consignments, and RCPs. The hurdle rates may incorporate both expected costs of carriage and expected displacement costs (bid prices). For the hurdle rate, the average variable cost is the average value of direct, incremental cost attributable to handling and carriage of traffic, for the indicated product, being transported over the indicated Booking Segment.

The method chosen to produce the minimum acceptable rate includes safeguards for certain conditions such as: a very low load factor index and a hurdle rate that exceeds a given products representative revenue (or average yield). A Minimum Acceptable Rate (MAR) calculation may be MAR=Min(Max(A, B, C), D), where A is the markup rate: equal to "Variable Cost" times (1+"Markup Percentage") and the Markup Percentage may be a reflection of the airline's business strategy and competitive environment, where B is the Hurdle Rate subject to Load Factor-adjustment with threshold, where C is the Floor rate (manually determined, based on the airline's business requirements), and D is the Ceiling rate (manually determined, based on the airline's business requirements).

The LMS Hurdle Rate table of a Cargo Revenue Management system may be populated with the outputs of CRM. This enables LMS to automatically apply hurdle rate restrictions at the time of booking confirmation. In one embodiment, CRM may send the hurdle rates to LMS on a regular basis using File Transfer Protocol (FTP).

At the time of booking, route and price requests, and/or during air waybill (AWB) capture, LMS prices the shipment or price request, and then prorates the transportation and other charges considered as revenue between the carriers transporting the shipment using Great Circle mileage proration methods. Once the host revenue is determined, it then prorates the host revenue between the booking segments using Great Circle mileage proration methods.

In some embodiments, LMS provides the interline and online proration information only to authorized users as controlled by View Revenue Management and Full Revenue Management user levels on the User Administration function, and/or other parameters. Routing and Price, Booking Information, and AWB Information sections display the amounts chargeable to the customer (e.g. transportation and other charges) and revenue fields (e.g. host revenue and yield). The proration information may be provided in the Revenue section of the Booking Information and AWB Information functions. Authorized users may select revenue data to be included in list functions, such as Flight Booking Restrictions, Outbound Flight Inventory, etc.

In some embodiments, LMS prices the shipment and/or routing and pricing request's transportation charges and other charges associated with the shipment or request. When the air waybill paper (ACN) is host, the Gross Revenue is calculated as the Total Actual Weight Charges plus any other charges that are considered revenue (e.g. Fuel Surcharge) as indicated by other functions. When the air waybill paper (ACN) is other airline paper, the Gross Revenue is calculated as the Total Actual Weight Charges.

When multiple carriers transport the shipment, as identified by the air waybill routing. LMS prorates the Gross Revenue between the carriers using, for example, the SPA or Great Circle Mileage algorithms. From this, the Host Revenue may be derived. The Host Revenue may then prorated between the booking segments (or flight segments for the routing and price request) using the Great Circle Mileage algorithms.

The prorated amounts may be stored with the booking or air waybill, and are available for display on the booking, air waybill, and list function displays for authorized users. When the airline is using the Cargo Revenue Management feature, then the Revenue Rate is compared to the Hurdle Rate for use in booking confirmation. In one embodiment, a Dynamic Hurdle Rate Interface parameter (C$CRMD set to "Y") controls the Booking or Routing and Price Evaluation with the Dynamic Hurdle Rate interface. LMS may dynamically request the hurdle rates from CRM when processing hurdle rates for a booking or a Routing and Price request based on the shipment characteristics and/or the current state of the flight requiring dynamic hurdle rates.

Figure 9:
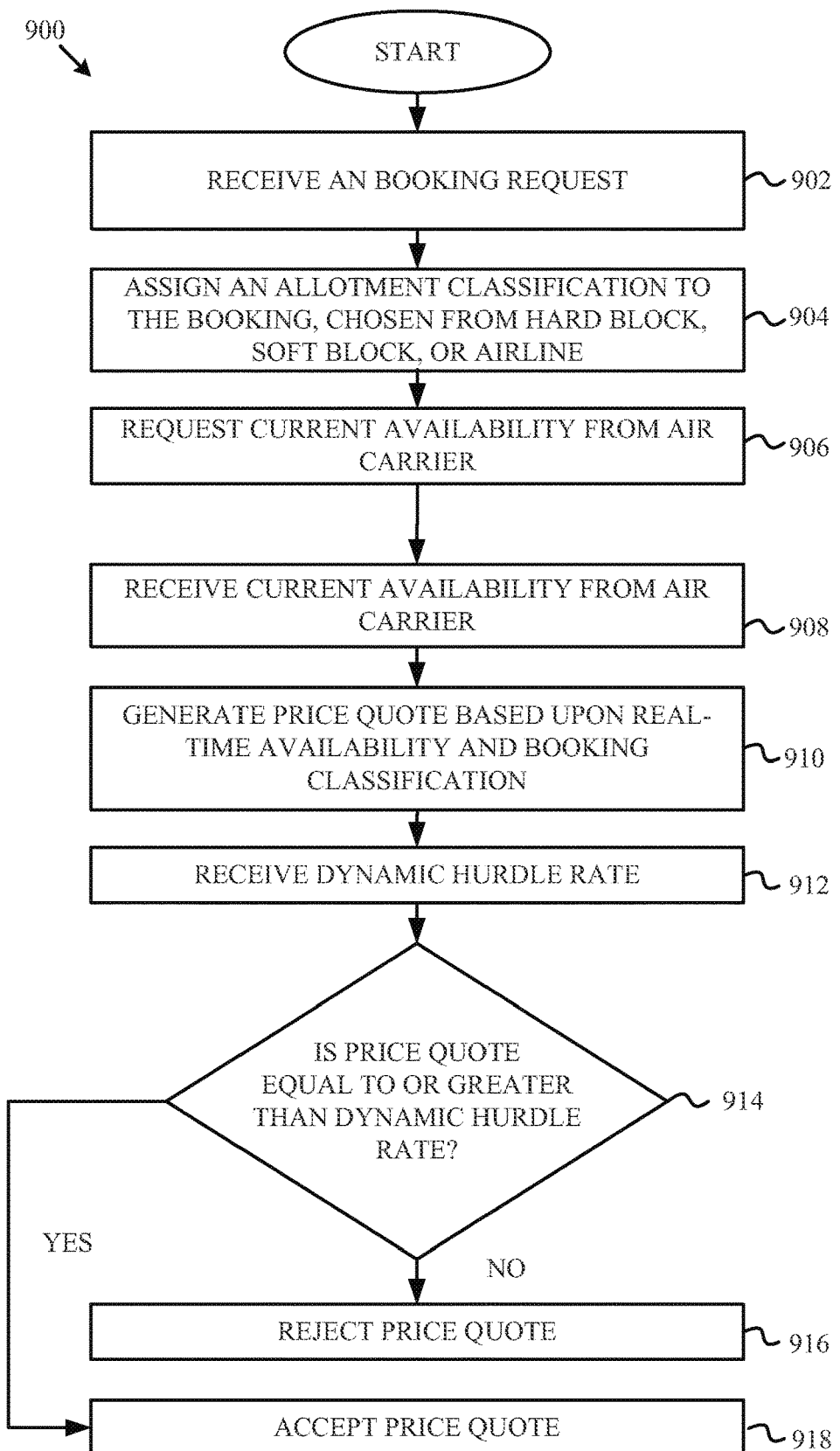
FIG. 9 is a flow chart illustrating a reservation process in which an allotment rate is generated which passes a dynamic hurdle rate according to one embodiment of the disclosure.

FIG. 9 is a flow chart illustrating a reservation process in which a booking rate is generated, which passes a dynamic hurdle rate according to one embodiment of the disclosure. A method 900 begins at block 902 with a request to create a booking. Further, the request may also include a change to an existing booking, or any other amendment that involves use of a dynamic hurdle rate. At block 904, the user of the LMS assigns an allotment category, such as in an allotment information function. The allotment category may impact the booking rate generated in subsequent steps. Next, the LMS communicates with an air carrier to determine the real-time availability of allotments onboard a particular route at block 906. At block 908, the LMS receives the current allotment availability from the air carrier. Based upon the allotment information received from the carrier at block 908, the LMS may generate a booking rate based upon the real-time allotment availability and the assigned allotment category at block 910 and further detailed above. Next, the LMS validates that the generated booking rate conforms to any applicable dynamic hurdle rates at block 912. At block 914, if the booking rate is equal to or greater than the dynamic hurdle rate, the method 900 proceeds to accept, by LMS, the booking rate at block 918. If not, the booking rate is rejected by the LMS at block 916. In cases where the booking rate does not conform with the dynamic hurdle rate, the LMS may accept the dynamic hurdle rate or return an error.

Users and administrators may have different privileges. For example, some users may be granted only creation and viewing access for allotments or bookings. However, administrators may be granted rights for viewing, updating, and deleting allotments or bookings. This updating may include changing the terms of a hard block or soft block reservation. Some administrators may have more limited rights, such as only splitting allotments or bookings into two or more separate allotments and bookings.

Figure 10:
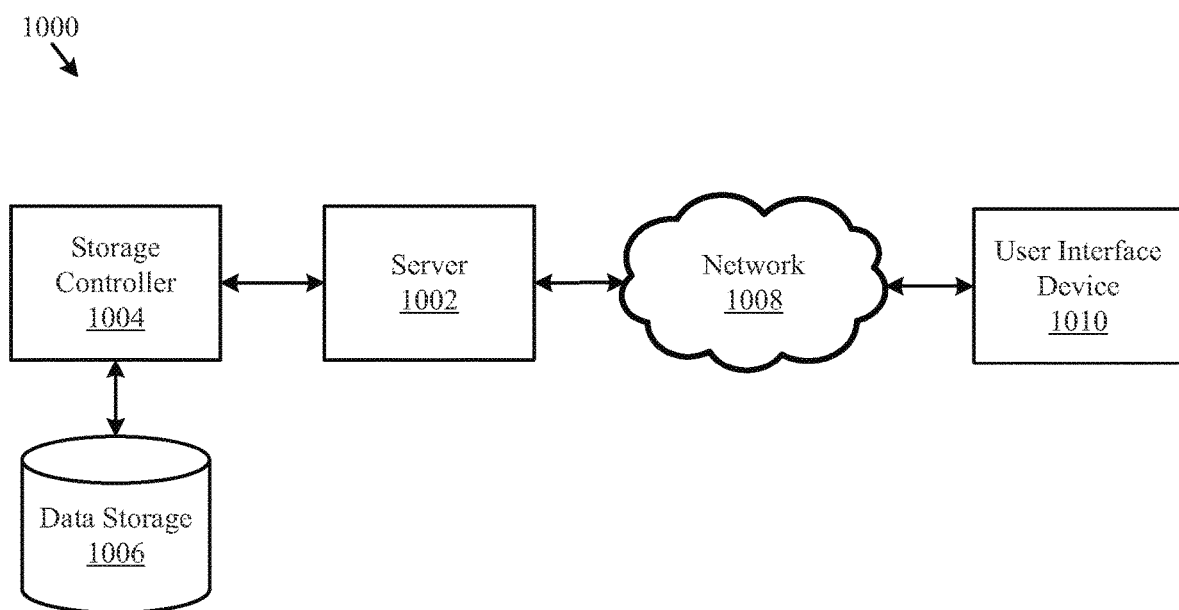
FIG. 10 is a block diagram illustrating a data management system configured to store databases, tables, and/or records according to one embodiment of the disclosure.

FIG. 10 illustrates one embodiment of a system 1000 for an information system, such as a logistics management system (LMS). The system 1000 may include a server 1002, a data storage device 1006, a network 1008, undo user interface device 1010. The server 1002 may be a dedicated server or one server in a cloud computing system. In a further embodiment, the system 1000 may include a storage controller 1004, or storage server configured to manage data communications between the data storage device 1006 and the server 1002 or other components in communication with the network 1008. In an alternative embodiment, the storage controller 1004 may be coupled to the network 1008.

In one embodiment, the user interface device 1010 is referred to broadly and is intended to encompass a suitable processor-based device such as a desktop computer, a laptop computer, a personal digital assistant (PDA) or tablet computer, a smartphone or other a mobile communication device having access to the network 1008. In a further embodiment, the user interface device 1010 may access the Internet or other wide area or local area network to access a web application or web service hosted by the server 1202 and provide a user interface for enabling a user to enter or receive information.

The network 1008 may facilitate communications of data between the server 1002 and the user interface device 1010. The network 1008 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, with one another.

In one embodiment, the user interface device 1010 accesses the server 1002 through an intermediate sever (not shown). For example, in a cloud application the user interface device 1010 may access an application server. The application server fulfills requests from the user interface device 1010 by accessing a database management system (DBMS). In this embodiment, the user interface device 1010 may be a computer executing a Java application making requests to a JBOSS server, executing on a Linux server, which fulfills the requests by accessing a relational database management system (RDMS) on a mainframe server.

In one embodiment, the server 1002 is configured to store databases, pages, tables, and/or records. Additionally, scripts on the server 1002 may access data stored in the data storage device 1006 via a storage area network (SAN) connection, a LAN, or a data bus. The data storage device 1006 may include, for example, a hard disk, including hard disks arranged in an redundant array of independent disks (RAID) array, a tape storage drive comprising a physical or virtual magnetic tape data storage device, or an optical storage device. The data may be arranged in a database and accessible through structured query language (SQL) queries, or other data base query languages or operations.

Figure 11:
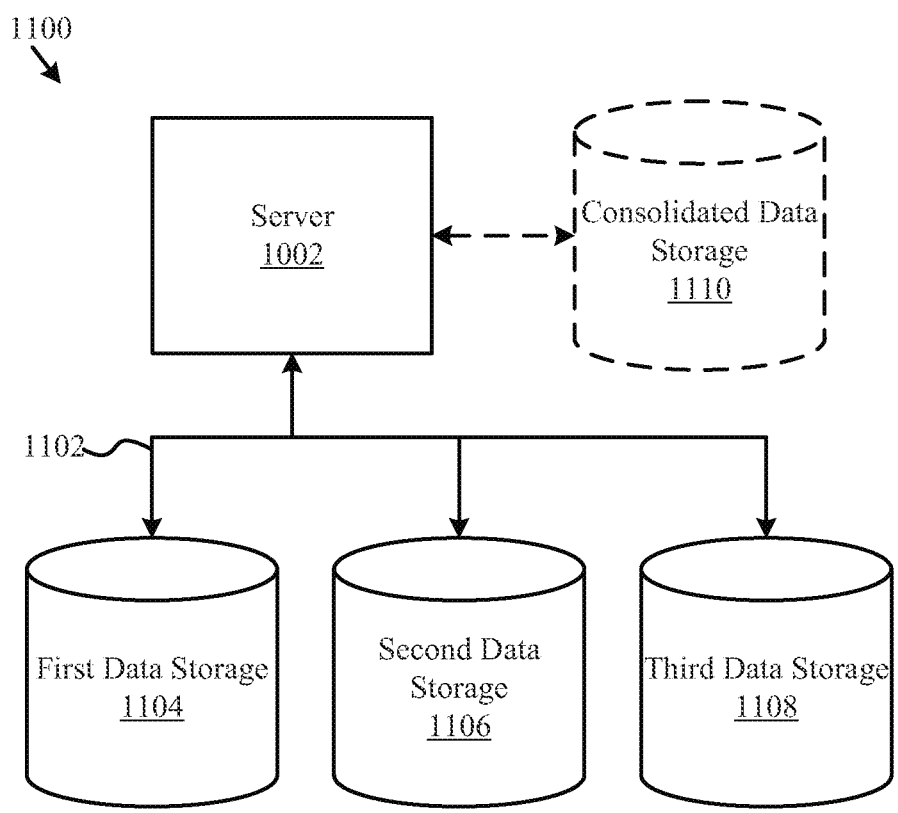
FIG. 11 is a block diagram illustrating a data storage system according to one embodiment of the disclosure.

FIG. 11 illustrates one embodiment of a data management system 1100 configured to store application parameters and documentation. In one embodiment, the data management system 1100 may include the server 1002. The server 1002 may be coupled to a data-bus 1102. In one embodiment, the data management system 1100 may also include a first data storage device 1104, a second data storage device 1106, and/or a third data storage device 1108. In further embodiments, the data management system 1100 may include additional data storage devices (not shown). In such an embodiment, each data storage device 1104, 1106, and 1108 may each host a separate database that may, in conjunction with the other databases, contain redundant data. Alternatively, a database may be spread across storage devices 1104, 1106, and 1108 using database partitioning or some other mechanism. Alternatively, the storage devices 1104, 1106, and 1108 may be arranged in a RAID configuration for storing a database or databases that may contain redundant data. Data may be stored in the storage devices 1104, 1106, 1108, 1110 in a database management system (DBMS), a relational database management system (RDMS), an object oriented database management system (OODMS), an indexed sequential access method (ISAM) database, a multi-sequential access method (MSAM) database, a conference on data systems languages (CODASYL) database, or other database system.

In one embodiment, the server 1002 may submit a query to select data from the storage devices 1104 and 1106. The server 1002 may store consolidated data sets in a consolidated data storage device 1110. In such an embodiment, the server 1002 may refer back to the consolidated data storage device 1110 to obtain a set of records. Alternatively, the server 1002 may query each of the data storage devices 1104, 1106, and 1108 independently or in a distributed query to obtain the set of data elements. In another alternative embodiment, multiple databases may be stored on a single consolidated data storage device 1110.

In various embodiments, the server 1002 may communicate with the data storage devices 1104, 1106, and 1108 over the data-bus 1102. The data-bus 1102 may comprise a storage area network (SAN), a local area network (LAN), or the like. The communication infrastructure may include Ethernet, fibre-channel arbitrated loop (FC-AL), fibre-channel over Ethernet (FCoE), small computer system interface (SCSI), internet small computer system interface (iSCSI), serial advanced technology attachment (SATA), advanced technology attachment (ATA), cloud attached storage, and/or other similar data communication schemes associated with data storage and communication. For example, the server 1002 may communicate indirectly with the data storage devices 1104, 1106, 1108, and 1110 by first communicating with a storage server (not shown) or the storage controller 1004. The server 1002 may execute software for the LMS and the CRM or the LMS and CRM applications may execute on two or more different servers (not shown) coupled by the network 1008.

The server 1002 may include modules for interfacing with the data storage devices 1104, 1106, 1108, and 1110, may include modules for interfacing with the network 1008, and/or modules for interfacing with a user through the user interface device 1010. In a further embodiment, the server 1002 may host an engine, application plug-in, or application programming interface (API).

Figure 12:
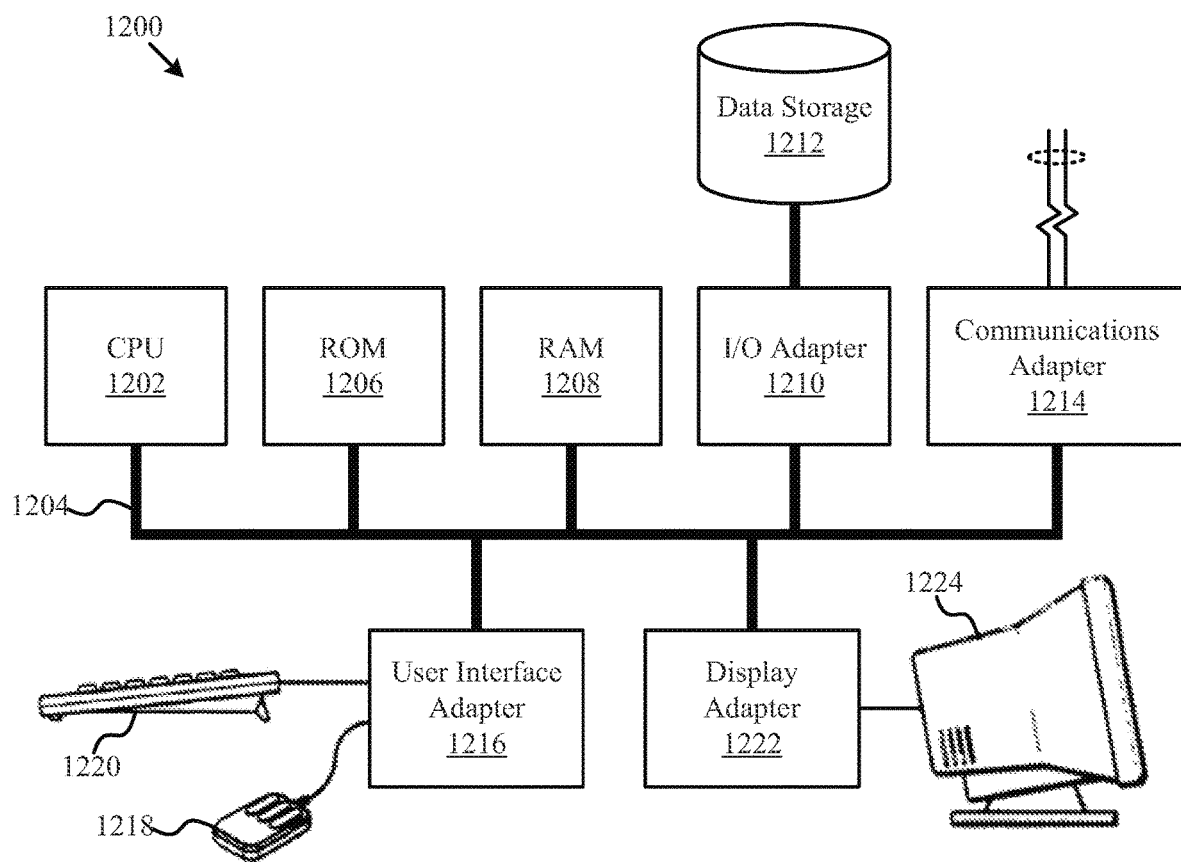
FIG. 12 is a block diagram illustrating a computer system according to one embodiment of the disclosure.

FIG. 12 illustrates a computer system 1200 adapted according to certain embodiments of the server 1002 and/or the user interface device 1010. The central processing unit ("CPU") 1202 is coupled to the system bus 1404. The CPU 1202 may be a general purpose CPU or microprocessor, graphics processing unit ("GPU"), and/or microcontroller. The present embodiments are not restricted by the architecture of the CPU 1202 so long as the CPU 1202, whether directly or indirectly, supports the modules and operations as described herein. The CPU 1202 may execute the various logical instructions according to the present embodiments.

The computer system 1200 also may include random access memory (RAM) 1208, which may be synchronous RAM (SRAM), dynamic RAM (DRAM), and/or synchronous dynamic RAM (SDRAM). The computer system 1200 may utilize RAM 1208 to store the various data structures used by a software application such as databases, tables, and/or records. The computer system 1200 may also include read only memory (ROM) 1206 which may be PROM, EPROM, EEPROM, optical storage, or the like. The ROM may store configuration information for booting the computer system 1200. The RAM 1208 and the ROM 1206 hold user and system data.

The computer system 1200 may also include an input/output (I/O) adapter 1210, a communications adapter 1214, a user interface adapter 1216, and a display adapter 1222. The I/O adapter 1210 and/or the user interface adapter 1216 may, in certain embodiments, enable a user to interact with the computer system 1200. In a further embodiment, the display adapter 1222 may display a graphical user interface (GUI) associated with a software or web-based application on a display device 1224, such as a monitor or touch screen.

The I/O adapter 1210 may couple one or more storage devices 1212, such as one or more of a hard drive, a flash drive, a compact disc (CD) drive, a floppy disk drive, and a tape drive, to the computer system 1200. The communications adapter 1214 may be adapted to couple the computer system 1200 to the network 1008, which may be one or more of a LAN, WAN, and/or the Internet. The communications adapter 1214 may be adapted to couple the computer system 1200 to a storage device 1212. The user interface adapter 1216 couples user input devices, such as a keyboard 1220, a pointing device 1218, and/or a touch screen (not shown) to the computer system 1200. The display adapter 1222 may be driven by the CPU 1202 to control the display on the display device 1224.

The applications of the present disclosure are not limited to the architecture of computer system 1200. Rather the computer system 1200 is provided, as an example of one type of computing device that may be adapted to perform the functions of a server 1002 and/or the user interface device 1010. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM. CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for improving functionalities of a logistics management system, comprising:

receiving, at a server, a reservation request from a requestor for a booking of an allotment on an air carrier's cargo hold for a designated route;

assigning, by the server, a classification to the reservation request;

validating, by the server, an availability of the requested booking with the air carrier;

generating a real-time dynamic hurdle rate based on a real-time air carrier capacity availability acquired by the server from the air carrier, wherein the logistics management system includes a first data storage and a consolidated data storage, the first data storage and the consolidated data storage including modules interfacing with the Internet, the server accesses the real-time carrier capacity from the first data storage, the server stores the real-time dynamic hurdle rate to the consolidated data storage;

generating, by the server, a price quote for the booking, based, at least in part, on the classification and the dynamic hurdle rate;

communicating, by the server, the price quote to the requestor;

receiving, by the server, an acceptance of the price quote and terms from the requestor to form commercial terms for the booking;

receiving a request to edit an allotment; and determining whether to allow editing of the allotment with an increased price quote based, at least in part, on the classification.

2. The method of claim 1, further comprising tracking, by the server, requests to change the booking.

3. The method of claim 1, in which the server comprises the logistics management system.

4. The method of claim 1, further comprising restricting acceptance of incoming external message requests to update only non-commercial terms.

5. The method of claim 4, wherein the shipment data for the requested booking is captured after receiving the acceptance of the price and terms, in which the incoming external message requests are saved to update only the non-commercial terms.

6. The method of claim 1, in which the step of generating the price quote is performed by applying at least one of an applicable contract, a market rates, or a tariff rate.

7. The method of claim 1, comprising:
assigning one of a hard block, a soft block, or an airline classification to the reservation request;
wherein determining whether to allow editing of the allotment with an increased price quote comprises:
determining the assigned classification;
allowing editing of the allotment without increasing the price quote if the assigned classification is an airline classification;
allowing editing of the allotment with increasing the price quote if the assigned classification is a hard block or a soft block; and
increasing the price quote if the classification is a hard block or a soft block.

8. A computer program product for improving functionalities of a logistics management system, comprising:
a non-transitory computer readable medium comprising:
code to receive a reservation request from a requestor for a booking on an air carrier's cargo hold for a designated route;
code to validate an availability of the requested booking with the air carrier;
code to generate a real-time dynamic hurdle rate based on a real-time air carrier capacity availability acquired by the server from the air carrier, wherein the logistics management system includes a first data storage and a consolidated data storage, the first data storage and the consolidated data storage including modules interfacing with the Internet, the server accesses the real-time carrier capacity from the first data storage, the server stores the real-time dynamic hurdle rate to the consolidated data storage;
code to generate a price quote for the booking based, at least in part, on the dynamic hurdle rate;
code to communicate the price quote to the requestor;
code to receive acceptance of the price quote and terms from the requestor to form commercial terms for the booking;
code to receive a request to edit an allotment; and
code to determine whether to allow editing of the allotment with increasing the price quote based, at least in part, on the classification.

9. The computer program product of claim 8, in which the medium further comprises code to track requests to change the booking.

10. The computer program product of claim 8, in which the price quote is generated with the logistics management system.

11. The computer program product of claim 8, in which the medium further comprises code to restrict acceptance of incoming external message requests to update only non-commercial terms.

12. The computer program product of claim 11, in which the medium further comprises:
code to capture the incoming external message requests are saved to update only the non-commercial terms.

13. The computer program product of claim 8, in which the code for generating a price quote comprises code to apply at least one of an applicable contract, a market rates, or a tariff rate.

14. The computer program product of claim 8, comprising:
code to assign one of a hard block, a soft block, or an airline classification to the reservation request;
wherein the code to determine whether to allow editing of the allotment with an increased price quote comprises:
code to determine the assigned classification;
code to allow editing of the allotment without increasing the price quote if the assigned classification is an airline classification;
code to allow editing of the allotment with increasing the price quote if the assigned classification is a hard block or a soft block; and
code to increase the price quote if the classification is a hard block or a soft block.

15. A system for improving functionalities of a logistics management system, comprising:
a memory and at least one processor, in which the at least one processor is coupled to the memory and the at least one processor is configured:
to receive a reservation request from a requestor for a booking on an air carrier's cargo hold for a designated route;
to validate an availability of the booking with the air carrier;
to generate a real-time dynamic hurdle rate based on a real-time air carrier capacity availability acquired by the server from the air carrier, wherein the logistics management system includes a first data storage and a consolidated data storage, the first data storage and the consolidated data storage including modules interfacing with the Internet, the server accesses the real-time carrier capacity from the first data storage, the server stores the real-time dynamic hurdle rate to the consolidated data storage;
to generate a price quote for the booking, based at least in part on the dynamic hurdle rate;
to communicate the generated price quote to the requestor;
to receive acceptance of the price quote and terms from the requestor to form commercial terms for the booking;
to receive a request to edit an allotment; and
to determine whether to allow editing of the allotment with increasing the price quote based, at least in part, on the classification.

16. The system of claim 15, in which the at least one processor is further configured to track requests to change the booking.

17. The system of claim 15, in which the at least one processor is further configured to restrict acceptance of incoming external message requests to updating non-commercial terms.

18. The system of claim 17, in which the processor is further configured:
to capture incoming external message requests as to update only the non-commercial terms.

19. The system of claim 15, in which the generation of a price quote is performed by applying any applicable contracts, market rates, or tariff rates.

20. The system of claim 15, wherein the at least one processor is configured to:

assign one of a hard block, a soft block, or an airline classification to the reservation request; and determine whether to allow editing of the allotment with an increased price quote by:

determining the assigned classification;

allowing editing of the allotment without increasing the price quote if the assigned classification is an airline classification;

allowing editing of the allotment with increasing the price quote if the assigned classification is a hard block or a soft block; and increasing the price quote if the classification is a hard block or a soft block.

* * * * *